United States Patent [19]
Tanaka et al.

[11] 3,934,265
[45] Jan. 20, 1976

[54] DITUBE TYPE COLOR TELEVISION CAMERA AND ITS APPLICATION TO AN APPARATUS FOR CONVERTING A COLOR FILM PICTURE IMAGE INTO A VIDEO SIGNAL

[75] Inventors: Syunpei Tanaka, Tama; Kozo Nakamizo, Sagamihara; Akira Tamagawa, Fuchu, all of Japan

[73] Assignee: Olympus Optical Co., Ltd., Tokyo, Japan

[22] Filed: Aug. 29, 1973

[21] Appl. No.: 392,790

[52] U.S. Cl. .................................. 358/43; 358/54
[51] Int. Cl.² ............................................ H04N 9/07
[58] Field of Search ....... 178/5.4 R, 5.4 ST; 358/43, 358/54

[56] References Cited
UNITED STATES PATENTS

| | | | |
|---|---|---|---|
| 3,015,688 | 1/1962 | Ridgeway | 178/5.4 ST |
| 3,300,580 | 1/1967 | Takagi et al. | 178/5.4 ST |
| 3,531,584 | 9/1970 | Bell | 178/5.4 ST |
| 3,548,089 | 12/1970 | Takagi et al. | 178/5.4 ST |
| 3,601,529 | 8/1971 | Dischert | 178/5.4 ST |
| 3,726,991 | 4/1973 | Takeumura et al. | 178/5.4 ST |
| 3,739,079 | 6/1973 | Noda et al. | 178/5.4 ST |

*Primary Examiner*—Richard Murray
*Attorney, Agent, or Firm*—Waters, Schwartz & Nissen

[57] ABSTRACT

A ditube type color television camera comprises a striped filter arranged near an object to be reproduced and including a striped filter element for screening blue or red color light only and a striped filter element for passing all visible lights, both the striped filter elements being arranged alternately side by side and assembled into one integral body such that the horizontal scanning direction of a chrominance signal detecting camera tube is perpendicular to the lengthwise direction of both the respective striped filter elements, and a dichroic mirror arranged between a brightness signal detecting camera tube and the chrominance signal detecting tube and adapted to separate the incident light into a green color light and red and blue color lights. The green light is accepted by the brightness signal detecting camera tube and the red and blue color lights are accepted by the chrominance signal detecting camera tube to obtain a brightness signal and a chrominance signal, respectively. An apparatus for converting a color film picture image into a video signal is provided in which the illuminating light emitted from an illuminating light source is incident on a color film continuously running along a circular track and which comprises an oscillating reflecting mirror, a stationary reflecting mirror arranged near but outside that scanning region of the running film which corresponds to the two frames of the running film, the above mentioned striped filter arranged just behind the color film and the above mentioned dichroic mirror adapted to accept the light reflected by the oscillatory reflecting mirror.

5 Claims, 13 Drawing Figures

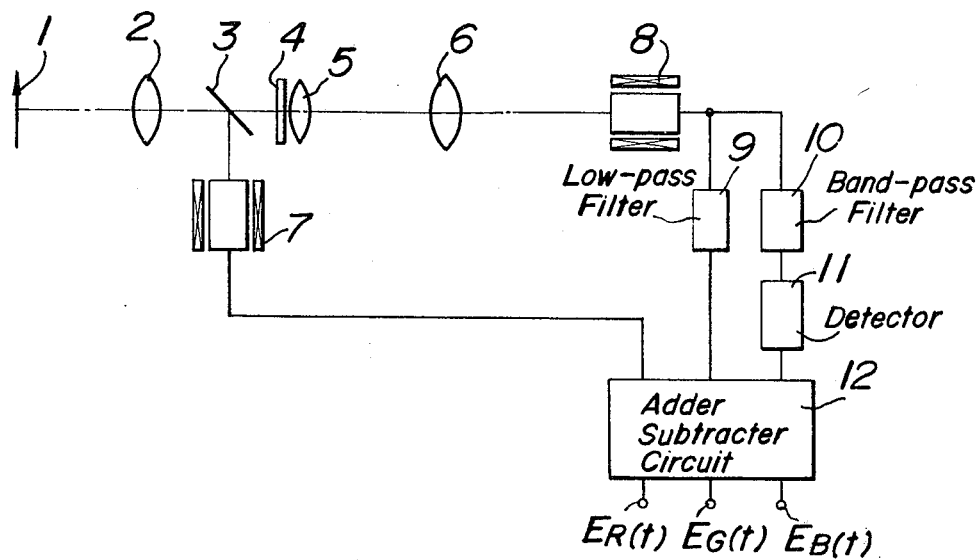
FIG_1 PRIOR ART
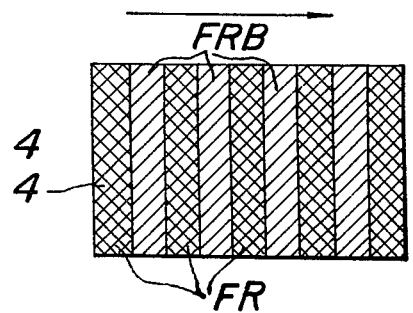
FIG_2 PRIOR ART

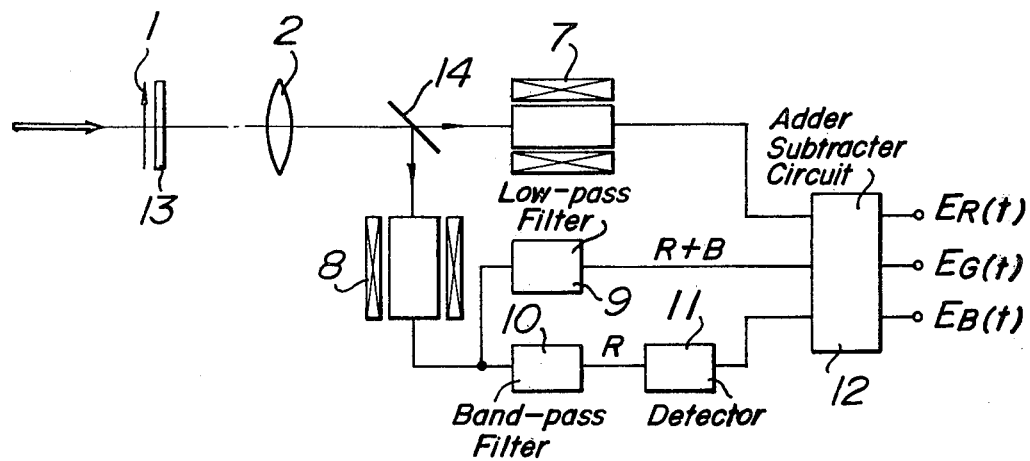
FIG_3
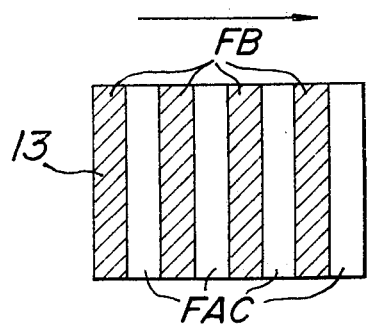
FIG_4

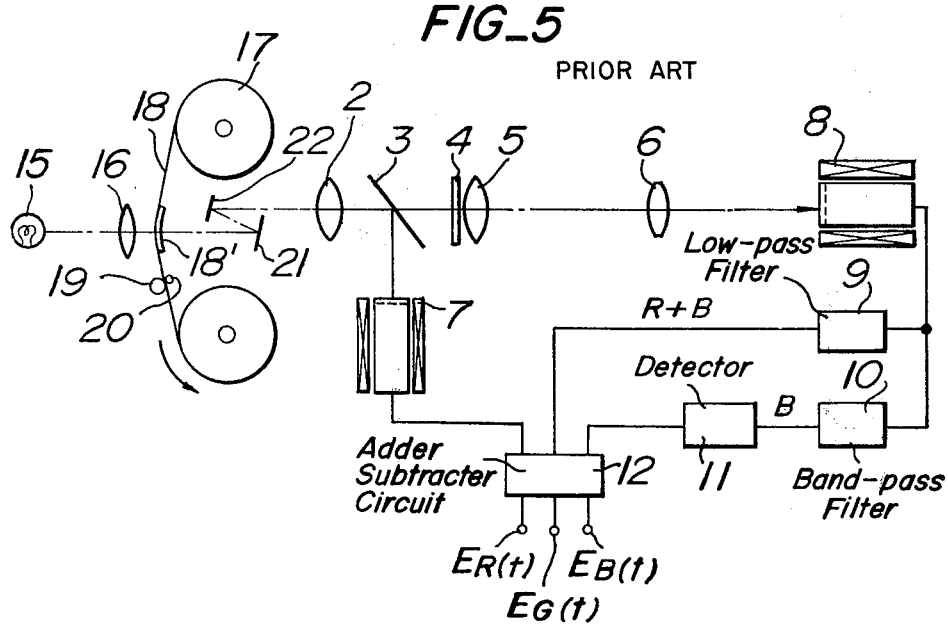

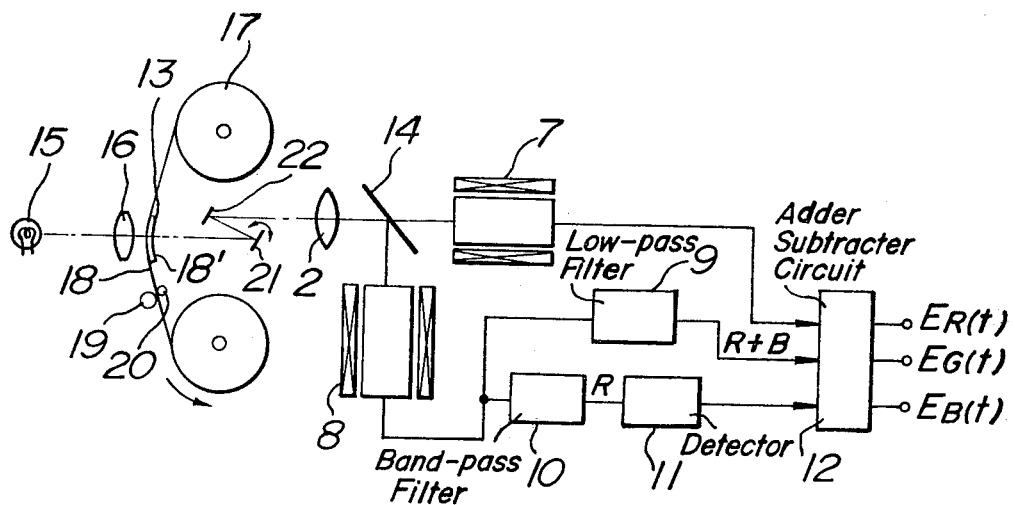
FIG_6
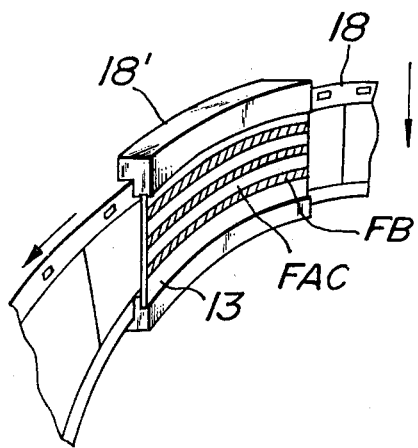
FIG_7

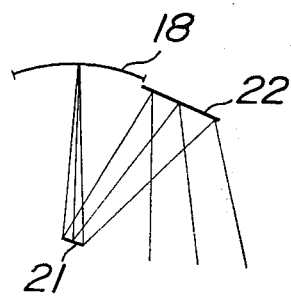
FIG_8
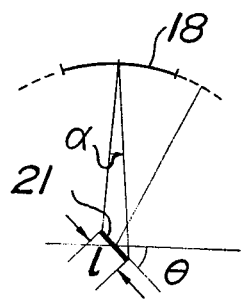
FIG_9
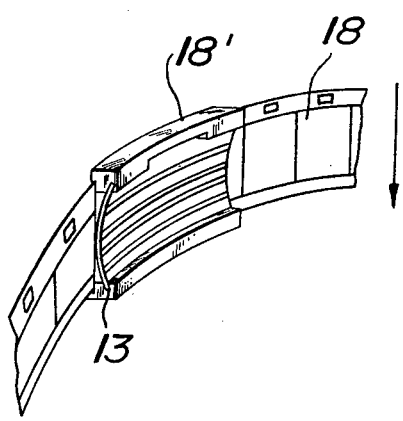
FIG_10

FIG_11
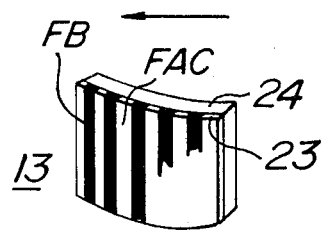
FIG_12A   FIG_12B
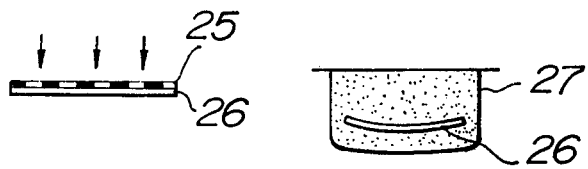

DITUBE TYPE COLOR TELEVISION CAMERA AND ITS APPLICATION TO AN APPARATUS FOR CONVERTING A COLOR FILM PICTURE IMAGE INTO A VIDEO SIGNAL

This invention relates to a ditube type color television camera and its application to an apparatus for converting a color film picture image into a video signal.

As well known in the art, various types of color television cameras including from a monotube type to a multitube type have heretofore been proposed. The monotube type color television camera is not required to effect an image registration, but has the disadvantage that the properties necessary for the camera tube, particularly, the definition resolving power must be high, and that the camera tube satisfying these properties becomes expensive. The multitube type color television camera comprising not smaller than three camera tubes has the disadvantage that provision must be made of an image registration adjusting mechanism, that it is very difficult to adjust a light separating optical system, and that the mechanism becomes complex and the camera is large in size and hence expensive. On the contrary, a ditube type color television camera has the advantage which is a compromise between the advantage of the monotube type color television camera and the advantage of the multitube type color television camera. Now, a prior art ditube type color television camera will be described with reference to FIGS. 1 and 2.

In FIG. 1, reference numeral 1 designates an object to be reproduced, 2 an objective lens, 3 a half mirror, 4 a striped filter, 7 a brightness signal detecting camera tube, and 8 a chrominance signal detecting camera tube. The optical image of the object to be reproduced 1 is passed through the objective lens 2 and divided by the half mirror 3 into the image incident on the light accepting photoelectric surface of the camera tube 7 and into the image incident on the stripe-shaped filter 4, respectively. The striped filter element 4 is composed of a striped filter FR which is capable of passing red color light only and of a striped filter element FRB which is capable of passing blue and red color lights, the striped filter elements FR and FRB being arranged alternately side by side and assembled into one integral body as shown in FIG. 2. In FIG. 1, the color image obtained after passing through the striped filter 4 consists of a red color component obtained by the striped filter element FR and a blue color component obtained by the striped filter element FRB. This color image is passed through a field lens 5 and a relay lens 6 and is incident on the light accepting photoelectric surface of the chrominance signal detecting camera tube 8. The lengthwise direction of the image on each stripe filter element of the striped filter 4 is made perpendicular to the horizontal scanning direction of the camera tube 8 as shown by an arrow in FIG. 2 so as to obtain an electric signal Eout from the camera tube 8.

The electric signal Eout is given by $$\text{Eout} = E_r(t) + \frac{E_B(t)}{2} \left\{1 + \frac{4}{\pi}\sin(\omega_\beta t+\phi)\right\} \quad (1)$$

where $E_R(t)$ is a signal corresponding to a red picture image, $E_B(t)$ is a signal corresponding to a blue picture image, and $\omega_\beta$ is an angular frequency determined by the width of each stripe of the striped filter 4 and by the horizontal scanning speed of the camera tube 8. The above equation represents the fundamental wave component only and the high frequency components higher than 2 $\omega_\beta$ are omitted for ease of illustration. The electric signal Eout from the camera tube 8 is supplied to a band-pass filter 10 to take out a component given by $$\frac{2E_B(t)}{\pi}\sin(\omega_\beta t+\phi)$$

and is also supplied to a low-pass filter 9 to take out a component given by $$E_R(t) + \frac{E_B(t)}{2}.$$

The output from the band-pass filter 10 is detected by a detector 11 to obtain an electric signal $$\frac{2E_B(t)}{\pi}$$

corresponding to the blue color light. The electric signal $$\frac{2E_B(t)}{\pi}$$

thus obtained is supplied to an adder - subtracter circuit 12. The output signal from the low-pass filter 9 and the output brightness signal from the brightness signal detecting camera tube 7 and given by $Y=0.11E_B(t)+0.59E_G(t)+0.30E_R(t)$ are also supplied to the adder - subtracter circuit 12. From the adder - subtracter circuit 12 are obtained color signals $E_R(t)$, $E_G(t)$ and $E_B(t)$ corresponding to the red, green and blue color lights of the object to be reproduced 1, respectively. The above mentioned prior art ditube type color television camera has the disadvantage that the optical system is complex in construction and long in length, and that the camera could not be made small in size.

An object of the invention is to provide a ditube type color television camera which can obviate the above mentioned disadvantage of the prior art ditube type color television camera, which is short in an optical system, which is endurable for vibrations, which is small in size, light in weight and less expensive, and which is particularly useful for converting the image of a continuously running color motion picture film into a video signal.

Another object of the invention is to provide an apparatus for converting a color film picture image into a video signal, which can make the optical system short in length and hence is highly endurable for vibrations and which is small in size, light in weight and less expensive.

A feature of the invention is the provision of a ditube type color television camera in which the light emitted from an object to be reproduced is separated into a light for a brightness signal and a light for chrominance signal and which comprises a first camera tube adapted to accept the light for the brightness signal and a second camera tube adapted to accept the light for the chrominance signal, whereby the brightness signal and chrominance signal are obtained from the first and second camera tubes, respectively, the camera comprising a striped filter arranged near the object to be reproduced and including a striped filter element for screening blue or red color light only and a striped filter element for passing all visible lights, both the striped filter elements being arranged alternately side by side and assembled into one integral body such that the horizontal scanning direction of the second camera tubes is perpendicular to the lengthwise direction of both the respective striped filter elements, and a dichroic mirror arranged between the first camera tube and the second camera tube and adapted to separate the incident light into a green color light and red and blue color lights, whereby the green color light is accepted by the first camera tube and the red and blue color lights are accepted by the second camera tube to obtain a brightness signal and a chrominance signal, respectively.

Another feature of the invention is the provision of an apparatus for converting a color film picture image into a video signal in which the illuminating light emitted from an illuminating light source is incident on a color film continuously running along a circular track and which comprises an oscillatory reflecting mirror arranged at the rear side of the color film surface and adapted to oscillate at a speed which is ½ times slower than the angular velocity of the running color film, and first and second camera tubes adapted to accept the light reflected by the oscillatory reflecting mirror, respectively, whereby the image of each frame of the running color film is converted into a color video signal, the apparatus comprising a striped filter arranged just behind the color film and including a striped filter element for screening the blue or red color light only and a striped filter element for passing all visible lights, both the striped filter elements being arranged alternately side by side and assembled into one integral body and in parallel with the running direction of the color film which is perpendicular to the scanning direction of the second camera tube, and a dichroic mirror arranged in front of the first and second camera tubes and adapted to accept the light reflected by the oscillatory reflecting mirro and separate the incident light into a green color light component and red and blue color light components, whereby the green color light component and the red and blue color light components are accepted by the first and second camera tubes, respectively, to obtain a brightness signal and a chrominance signal, respectively.

The invention will now be described in detail in connection with the attached drawings, wherein:

FIG. 1 is a diagram of a prior art ditube type color television camera;

FIG. 2 is an enlarged view of a striped filter used in the camera shown in FIG. 1;

FIG. 3 is a diagram of a ditube type color television camera according to the invention;

FIG. 4 is an enlarged view of the striped filter used in the camera shown in FIG. 3;

FIG. 5 is a diagram of a prior art apparatus for converting a color film picture image into a video signal;

FIG. 6 is a diagram of an apparatus for converting a color film picture image into a video signal according to the invention;

FIG. 7 is an enlarged perspective view of a striped filter and a film guide used in the apparatus shown in FIG. 6;

FIGS. 8 and 9 illustrate a relative position between the oscillatory reflecting mirror and the stationary reflecting mirror used in the apparatus shown in FIG. 6;

FIG. 10 is an enlarged perspective view showing a modified striped filter used in the apparatus shown in FIG. 6;

FIG. 11 is an enlarged perspective view showing another modified striped filter used in the apparatus shown in FIG. 6; and FIGS. 12A and 12B illustrate a method of manufacturing the striped filter shown in FIG. 11.

In FIG. 3 is shown a ditube type color television camera according to the invention in which an illuminating light shown by a double arrow is incident on an object to be reproduced 1. Near the object to be reproduced 1 is arranged a striped filter 13 to form an image of the object 1 thereon. The image on the filter 13 is passed through an objective lens 2 and incident on a dichroic mirror 14 by which the incident light is separated to form images on the light accepting photoelectric surfaces of a brightness signal detecting camera tube 7 (a first camera tube) and a chrominance signal detecting camera tube 8 (a second camera tube), respectively. The output signals from the respective camera tubes 7 and 8 are supplied to the above mentioned circuit of the prior art ditube type color television camera to obtain color signals $E_R(t)$, $E_G(t)$, and $E_B(t)$, corresponding to the red, green and blue color lights of the object to be reproduced 1, respectively. The striped filter 13 is composed of a striped filter element $F_B$ which is capable of screening a blue color light and a striped filter element FAC which is capable of passing all visible lights and in which the striped filter elements FB and FAC are arranged alternately side by side and assembled into one integral body as shown in FIG. 4. The dichroic mirror 14 is adapted to be penetrated through by the green color image only and reflect the red and blue color images.

The operation of the ditube type color television camera according to the invention will now be described. The illuminating light is incident on the object to be reproduced 1 and the light reflected by the object 1 is passed through the striped filter 13 and objective lens 2 and incident on the dichroic mirror 14. As described above, the dichroic mirror 14 is capable of passing the green color light therethrough to form the image on the light accepting photoelectric surface of the brightness signal detecting camera tube 7 and of reflecting the red and blue color lights by it to form the image on the light accepting photoelectric surface of the chrominance signal detecting camera tube 8. The output brightness signal from the brightness signal detecting camera tube 7 is supplied to the input terminal of the adder - subtracter circuit 12. The output signal from the chrominance signal detecting camera tube 8 is supplied to the input terminals of the low-pass filter 9 and of the band-pass filter 10, respectively. The output signal from the low-pass filter 9, that is, a signal corresponding to the red and blue color picture images of the object 1 is supplied to the input terminal of the adder - subtracter circuit 12. The output signal from the band-pass filter 10, that is, an alternating current signal corresponding to the red picture image of the object 1 is detected by the detector 11 to obtain a direct current signal which is proportional to the alternating current component. The direct current signal thus obtained is supplied to the adder - subtracter circuit 12. The signals supplied to the adder - subtracter circuit 12 enable the color signals $E_R(t)$, $E_G(t)$ and $E_B(t)$ corresponding to the red, green and blue colors of the object 1, respectively, to be obtained.

The position of the chrominance signal detecting camera tube 8 is so adjusted that the image on the striped filter 13 is formed on the light accepting photoelectric surface of the camera tube 8. In this case, the image of the object to be reproduced 1 becomes more or less blurred. But, this does not cause a trouble since the frequency of the chrominance signal is a frequency whose frequency band is narrower than that of the frequency of the brightness signal, but causes the Moiré phenomenon produced by an interference between the object to be reproduced 1 and the striped filter 13 to be decreased.

The image of the striped filter 13 represents a pattern composed of a red and blue color stripe and a red color stripe arranged alternately side by side. Thus, the effect of the striped filter 13 is just the same as that of the prior art striped filter 4 shown in FIGS. 1 and 2. In addition, the output chrominance signal from the camera tube 8 is treated in the same manner as in the case of the prior art camera.

The invention is particularly useful for reproduction of the image of an object which is plane and which can be illuminated by a penetrating light such, for example, as a film, microscope specimen, etc. In addition, the invention is not required to provide constitutional lenses such as the field lens 5, relay lens 6 provided for the prior art ditube type color television camera tube, and as a result, the camera becomes small in size for an extent at least that optical length which is occupied by the above mentioned lenses. In addition, the color television camera according to the invention is not required to adjust the optical axis alignment, image formation, magnification and relative position, etc. of the striped filter 4, field lens 5 and relay lens 6 which have been provided for the prior art ditube type color television camera, thereby eliminating the optical aberrations and strain caused by these optical elements. In addition, the invention provides a practical ditube type color television camera which is short in its light path and hence is highly endurable for vibrations and small in size, light in weight and less expensive.

As described above, the invention is particularly useful for reproduction of the image of a color film. For instance, the invention can be applied to an apparatus for converting a color film picture image into a video signal and can reproduce a continuously running color motion picture color film picture image on a television picture surface.

The most general prior art apparatus for converting a color film picture image into a video signal is a tritube type apparatus which comprises a light separating optical system including a dichroic mirror. Such prior art apparatus has the disadvantage that provision must be made of an image registration correcting mechanism, that it is very difficult to adjust the light separating optical system, and that the apparatus is large in size and expensive. In order to obviate such disadvantage, a ditube type apparatus has heretofore been proposed.

In FIG. 5 is shown a prior art ditube type apparatus for converting a color film picture image into a video signal.

In FIG. 5, reference numeral 15 designates a light source, 16 an illuminating lens, 17 a film holder, 18 a color motion picture film, and 18' a film guide. The light emitted from the light source 15 is passed through the illuminating lens 16 and uniformly incident on that area of the film 18 which corresponds to two frames. Provision is made of a capstan 19 and a pinch roller 20 for the purpose of continuously running the film 18 along a circular track in a direction shown by an arrow. 21 designates an oscillatory reflecting mirror, and 22 a stationary reflecting mirror.

The oscillatory reflecting mirror 21 is caused to be oscillated along a saw-tooth-shaped path at an angular speed which is ½ lower than the angular speed of the frame of the running film 18 in response to the frame synchronizing pulse period obtained every time each frame passes through one point on the film guide 18' by means of a prior art frame synchronizing pulse detector (not shown). As a result, each frame on the film 18 can be seen through the oscillatory reflecting mirror 21 as if each frame is stationary.

The image of this frame which looks like stationary after reflected by the stationary mirror 22 is incident through the objective lens 2 on the half mirror 3 which serves to penetrate and reflect the image as described with reference to FIG. 1.

The image reflected by the half mirror 3 is formed on the light accepting photoelectric surface of the brightness signal detecting camera tube 7 to obtain a brightness signal Y which is supplied to the adder - subtracter circuit 12. The image penetrated through the half mirror 3 is formed on the striped filter 4. The striped filter 4 is composed of the blue color passing filter element FR and the red and blue color passing filter element FRB, both filter elements being alternately arranged side by side such that the lengthwise direction of the image on each filter element is perpendicular to the horizontal scanning direction of the chrominance signal detecting camera tube 8 as shown by the arrow in FIG. 2. The image passed through the striped filter 4 is supplied through the field lens 5 and the relay lens 6 to the light accepting photoelectric surface of the chrominance signal detecting camera tube 8 to obtain the above mentioned output chrominance signal Eout.

The electric output signal Eout obtained by the camera tube 8 is supplied through the low-pass filter 9 to the adder - subtracter circuit 12. The electric output signal Eout is also supplied through the band-pass filter 10 and the detector 11 to the adder - subtracter circuit 12.

The brightness signal Y given by $Y=0.11E_B(t)+0.59E_G(t)+0.30E_R(t)$ and obtained by the camera tube 7 is also supplied to the adder - subtracter circuit 12. Thus, the color signals $E_R(t)$, $E_G(t)$ and $E_B(t)$ corresponding to the red, green and blue color lights of the object 1, respectively, are obtained from the adder - subtracter circuit 12.

It has heretofore been well known to make each frame on the continuously running color film stationary to obtain a color video signal. Such prior art apparatus, however, has the disadvantage that the chrominance signal detecting optical system including the field lens 5 and the relay lens 6 becomes long in length so that it is difficult to make the apparatus compact, and that the use of the field lens 5, relay lens 6, etc. results in a difficulty for optical adjustment.

In FIG. 6 is shown an apparatus according to the invention which is not provided with the half mirror 3, striped filter 4, field lens 5 and realy lens 6, all of these elements being provided for the prior art apparatus shown in FIG. 5. In the present invention, use is made of the striped filter 13 shown in FIG. 4 and the dichroic mirror 14 shown in FIG. 5. The striped filter 13 is mounted on the film guide 18' as shown in FIG. 7 and the dichroic mirror 14 is arranged at that position which is occupied by the half mirror 3 provided for the prior art apparatus shown in FIG. 5. Parts constituting the apparatus according to the invention other than those described above are the same as those of the prior art apparatus shown in FIG. 5.

The operation of the apparatus according to the invention is as follows. The illuminating light emitted from the light source 15 is passed through the illuminating lens 16 and uniformly irradiated on that area of the motion picture color film 18 which corresponds to two frames. The film 18 is made continuously running in a direction shown by an arrow by means of the capstan 19 and the pinch roller 20. Each frame image of the film 18 is incident on the oscillatory reflecting mirror 21 and can be seen as if the frame is stationary in the same manner as in the prior art apparatus shown in FIG. 5. The striped filter 13 is mounted on the film guide 18' as shown in FIG. 7.

The striped filter 13 is composed of the blue color light screening striped filter element FB and the all visible light passing striped filter element FAC, these filter elements being alternately arranged side by side such that the lengthwise direction of each stripe is coincident with the running direction of the film 18 as shown by an arrow in FIG. 7. As a result, the lengthwise direction of each stripe is perpendicular to the scanning direction of the camera tube 8 for each frame of the film 18 as shown by an arrow in FIG. 7. Thus, when the light incident on the film 18 passes through the striped filter 13, only the blue color light is modulated by means of the blue color light screening stripe filter element FB.

When the image of the red color light and the image of all visible light are passed through the oscillatory reflecting mirror 21, stationary reflecting mirror 22 and objective lens 2 and incident on the dichroic mirror 14, the dichroic mirror 14 can penetrate the green color light and reflects the red and blue color lights, and as a result, the green color image is incident on the light accepting phototelectric surface of the brightness signal detecting camera tube 7 and the red and blue color images is incident on the light accepting photoelectric surface of the chrominance signal detecting camera tube 8. In the image incident on the chrominance signal detecting camera tube 8, only the blue color light is modulated and the red color light is not modulated so that the above mentioned equation (1) is applied to this image as in the prior art apparatus as shown in FIG. 5.

The electric signals obtained by the camera tubes 7 and 8 are treated in the same manner as in the prior art apparatus shown in FIG. 5 to obtain the color signals $E_R(t)$, $E_G(t)$ and $E_B(t)$ from the adder - subtracter circuit 12, respectively.

The color image formed on the light accepting photoelectric surface of the chrominance signal detecting camera tube 8 becomes more or less blurred owing to a gap between the film 18 and the striped filter 13. But, such blur does not cause a trouble for the chrominance signal since a wide frequency band is not required for the chrominance signal contrary to the brightness signal. On the contrary, the presence of the gap prevents a Moiré phenomenon produced by the interference between the filter 13 and the picture image on the film 18. The color of the light penetrated through the dichroic mirror 14 is green which is not subjected to the influence of the striped filter 13. In addition, the position of the picture image on the film 18 is adjusted such that the picture image on the film 18 is formed on the light accepting photoelectric surface of the camera tube 7, and as a result, the electric signal obtained from the camera tube 7 is a green color signal having a wide frequency band.

As explained hereinbefore, the use of the measures described ensures a material decrease in the number of parts constituting the optical system and hence decreases the length of the light path between the dichroic mirror and the chrominance signal detecting camera tube and further provides the important advantage that the adjustment of the optical system such as the optical axis alignment, image formation, magnification and relative position is not required and hence the optical aberrations and strain caused by the parts constituting the optical system can be eliminated. Thus, the invention provides an apparatus for converting a color film picture image into a video signal which is endurable against vibrations owing to the shortening of the light path and which is small in size, light in weight and less expensive, and which is useful in practice.

In the present invention, it is preferable to arrange the stationary reflecting mirror 22 near but outside that scanning region of the running film 18 which corresponds to the two frames of the running film 18 as shown in FIG. 8 such that the light reflected by the oscillatory reflecting mirror 21 can effectively be reflected by the stationary reflecting mirror 22.

In FIG. 9, an angle α subtended by each line connecting each end of the oscillatory reflecting mirror 21 to one point P on the film 18 is given by $$\alpha = 2\tan^{-1} \frac{\frac{l}{2}\cos\theta}{R}$$

where $l$ is a length of the oscillatory reflecting mirror 21, R is a radius of the circular track of the running film 18 and Θ is an angle of the oscillatory reflecting mirror 21 inclined from the vertical to the optical path. It is desired to make Θ as small as possibles in order to make α large for the purpose of increasing the resolving power. But, if Θ=0, all of the lights reflected by the oscillatory reflecting mirror 21 are fed back to the film 18 so that it is impossible to incident the reflected light on the objective lens 2. In the present invention, Θ is chosen to a relatively small angle such that the reflected light from the oscillatory reflecting mirror 21 is incident on a region near but outside the scanning region corresponding to the two frames of the running film 18 as shown in FIG. 8. The stationary reflecting mirror 22 is arranged at this region and in opposition to the oscillatory reflecting mirror 21. This makes it possible to effectively utilize the mirror area of the oscillatory reflecting mirror 21. As a result, even if the oscillatory reflecting mirror 21 having a small mirror area is used, a high resolving power and high response speed of the oscillatory reflecting mirror 21 can be obtained.

In the present invention, it is also preferable to make the surface of the striped filter 13 spherical or toric in shape as shown in FIG. 10. Such spehrical or toric-shaped striped filter 13 causes its image to be uniformly formed on the scanning region of the light accepting photoelectric surface of the camera tube 8 and as a result, a color unevenness in the reproduced picture image can be reduced. In addition, the total surface of the spherical or toric-shaped striped filter 13 becomes symmetrical with respect to the optical axis so that the optical image curvature can be corrected by means of the objective lens 2 in a relatively simple and easy manner.

In the present invention, it is preferable to use as the striped filter 13 a filter composed of a striped diazo film 23 cemented on an arcuate transparent substrate 24 as shown in FIG. 11. Such striped filter 13 may be manufactured as follows. A metal mask 25 whose dimensions and shape are the same as those of the striped filter 13 is closely adhered to a diazo film 26 and the assembly is subjected to ultra-violet rays emitted as shown by arrows in FIG. 12A from a mercury vapor lamp (not shown). Then, the diazo film 26 exposed to the ultra-violet rays is disposed in a container 27 containing an ammonia gas as shown in FIG. 12B, and as a result, the masked portions of the diazo film 26 are developed by the ammonia gas to produce, for example, blue or red color in striped patterns. Any proper optical system may be used in place of the metal mask 254 to manufacture the striped filter 13.

In the diazo film, the color element formed is dispersed in molecular state so that the color element does not show any particle distribution as encountered by photographs developed by silver halide emulsion. As a result, the diazo film has a high resolving power and is significantly useful for the striped filter 13. In addition, use may be made of various kinds of color element forming agents to develop various kinds of colors.

The invention is not limited to the above described embodiments, but various modifications in the above described embodiments of the invention are possible. For example, the striped filter 13 may be provided with a red color screening striped filter element instead of the blue color screening filter element FB without altering the above described operation and advantageous effect of the apparatus.

What is claimed is:

1. A ditube type color television camera in which the light emitted from an object to be reproduced is separated into a light for a brightness signal and a light for a chrominance signal and which comprises a first camera tube adapted to accept the light for said brightness signal and a second camera tube adapted to accept the light for said chrominance signal, whereby said brightness signal and chrominance signal are obtained from said first and second camera tubes, respectively, said camera comprising a striped filter arranged near said object to be reproduced and including a striped filter element for screening blue or red color light only and a striped filter element for passing all visible lights, both said striped filter elements being arranged alternately side by side and assembled into one integral body such that the horizontal scanning direction of said second camera tube is perpendicular to the lengthwise direction of both the respective striped filter elements, and a dichroic mirror arranged between said first camera tube and second camera tube and adapted to separate the incident light into a green color light and red and blue color lights, whereby said green light is accepted by said first camera tube and said red and blue color lights are accepted by said second camera tube to obtain a brightness signal and a chrominance signal, respectively.

2. An apparatus for converting a color film picture image into a video signal in which the illuminating light emitted from an illuminating light source is incident on a color film continuously running along a circular track and which comprises an oscillatory reflecting mirror arranged at the rear side of the color film surface and adapted to oscillate at a speed which is ½ times slower than the angular velocity of the running color film, and first and second camera tubes adapted to accept the light reflected by said oscillatory reflecting mirror, respectively, whereby the image of each frame of said running color film is converted into a color video signal, said apparatus comprising a striped filter arranged just behind said color film and including a striped filter element for screening the blue or red color light only and a striped filter element for passing all visible lights, both said striped filter elements being arranged alternately side by side and assembled into one integral body and in parallel with the running direction of said color film which is perpendicular to the scanning direction of said second camera tube and a dichroic mirror arranged in front of said first and second camera tubes and adapted to accept the light reflected by said oscillatory reflecting mirror and separate the incident light into a green color light component and red and blue color light components, whereby said green light component and red and blue color light components are accepted by said first and second camera tubes, respectively, to obtain a brightness signal and a chrominance signal, respectively.

3. An apparatus for converting a color film picture image into a video signal as claimed in claim 2, comprising a stationary reflecting mirror arranged near but outside that scanning region of said running film which corresponds to the two frames of said running film and being adapted to reflect the light reflected by said oscillatory reflecting mirror towards said first and second camera tubes.

4. An apparatus for converting a color film picture image into a video signal as claimed in claim 2, wherein the surface of said striped filter is made spherical or toric in shape.

5. An apparatus for converting a color film picture image into a video signal as claimed in claim 2, wherein said striped filter composed of a striped diazo film cemented on an arcuate transparent substrate.

* * * * *